Patented Mar. 23, 1948

2,438,125

UNITED STATES PATENT OFFICE 2,438,125

STABILIZATION OF OXIDIZED AROMATIC HYDROCARBONS

Eugene J. Lorand and John E. Reese, Wilmington, Del., assignors to Hercules Powder Company, Wilmington, Del., a corporation of Delaware No Drawing. Application September 4, 1945, Serial No. 614,434

9 Claims. (Cl. 260—592)

This invention relates to the oxidation of alkyl-substituted aromatic compounds having the structural formula

in which $R_1$ and $R_2$ represent alkyl groups and Ar represents a substituent selected from the group consisting of aryl and substituted aryl groups. More particularly the invention relates to the stabilization of reaction mixtures produced by the oxidation of compounds such as p-cymene.

It is known that p-cymene, for example, may be oxidized by means of air or molecular oxygen to reaction products which may include p-toluic acid, terephthalic acid, p-methylacetophenone, cumic acid, cumaldehyde, 8-hydroxycymene and p-methyl-α-methyl styrene, the particular reaction products obtained being dependent upon the reaction conditions involved. It also is known that the oxidation products of p-cymene may contain varying amounts of oxygen-containing compounds which are sensitive to thermal decomposition, in some cases with explosive violence, particularly under the conditions utilized in distillation of the oxidation products. Various methods for the removal of these decomposable oxygen-containing compounds, presumably hydroperoxides, from the oxidation products have been suggested. Washing the oxidation reaction mass with aqueous alkali and controlled heat-treatment of the reaction mass are exemplary of the methods proposed, but none of the methods has been successful in effecting substantial removal of the peroxides without also causing undesirable side reactions, such as dehydration of reaction products containing tertiary hydroxyl groups to form substituted styrenes. Although the stabilization of oxidized p-cymene has been used as an example, the same situation generally exists relative to the oxidation products of the alkyl-substituted aromatic compounds having the structural formula set forth above.

Now in accordance with this invention it has been found that reaction mixtures produced by the oxidation of alkyl-substituted aromatic compounds having the structural formula

in which $R_1$ and $R_2$ represent alkyl groups and Ar represents a substituent selected from the group consisting of aryl and substituted aryl groups may be stabilized by heating said reaction mixtures at a temperature between about 100° C. and about 130° C. in the presence of aqueous alkalies.

In carrying out the process of this invention the reaction mixture resulting from the oxidation of p-cymene, for example, with an oxygen-containing gas is heated with a solution of an alkali such as sodium hydroxide until a sample of the reaction mixture shows the absence of substantial amounts of peroxides, as evidenced by the amount of iodine liberated when the sample is added to an acidified alkali metal iodide solution. Following stabilization of the oxidation reaction mixture, the latter is separated from the aqueous alkali used during stabilization, dried and distilled to recover the desired products.

Now having generally outlined the embodiments of this invention, the following examples constitute specific illustrations. All amounts are based on parts by weight.

*Example 1*

Four hundred parts of a mixture containing 29% cymene hydroperoxide, having a refractive index of 1.5114 (20° C.), and obtained by the air oxidation of p-cymene in the presence of aqueous 2% sodium hydroxide and activated carbon at a temperature of 60°–90° C. was placed in a still equipped with an agitator and a condenser for distillation. To the still then was added 300 parts of 8% sodium hydroxide solution. Agitation was begun and the reaction mixture was heated at a pot temperature of 103°–110° C. The distillation was continued for about 8 hours until a sample of the oxidized oils taken from the still contained not more than 1% cymene hydroperoxide as calculated from the amount of iodine liberated when the sample was added to an acidified potassium iodide solution. Upon completion of the distillation, the oils remaining in the still were separated from the aqueous sodium hydroxide solution and combined with the oils which had distilled. The combined oils then were washed with water, dried over anhydrous sodium sulfate and subjected to fractional distillation at 25 mm. of mercury pressure. There were obtained a forerun of unoxidized p-cymene and 230 parts of a fraction distilling at 120° C. and containing about 90% 8-hydroxycymene and about 10% p-methylacetophenone. The fraction distilling at 120° C. had a refractive index of 1.5208 (20° C.).

The sodium hydroxide solution used during the distillation was acidified with dilute sulfuric acid and the resulting precipitate separated from the aqueous layer. This precipitate consisted mainly of cumic acid but small amounts of terephthalic acid also were present.

*Example 2*

Six hundred three parts of a mixture containing about 21% cymene hydroperoxide and obtained by the air oxidation of p-cymene in the presence of aqueous sodium hydroxide and activated carbon at a temperature of 75°–88° C. was extracted several times with 2% sodium carbonate. The alkaline extracts were combined with the aqueous alkaline layer used during the oxidation and the combined aqueous material was acidified with 25% sulfuric acid to precipitate 58 parts of organic acids, mainly cumic.

The extracted oils were stabilized according to the procedure of Example 1 using 300 parts of 4% sodium hydroxide. Fractional distillation of the stabilized oils in a packed column at 25 mm. of mercury gave 218 parts of a fraction boiling at 120.5°–121.5° C. and consisting of 90% 8-hydroxycymene and 10% p-methylacetophenone.

*Example 3*

Seven hundred eighty-six parts of a mixture containing 18.2% peroxides and obtained by the air oxidation of cumene in the presence of a 2% sodium hydroxide solution and activated carbon at a temperature of 65°–90° C. was placed in the apparatus described in Example 1. To the still was added 500 parts of a 4% sodium hydroxide solution and the mixture then distilled at a pot temperature of 102°–110° C. to obtain 699 parts of steam distillable material which was washed with water, dried over anhydrous sodium sulfate and fractionated in a Fenske packed column at 50 mm. of mercury pressure. There were obtained 172 parts of unreacted cumene and 435 parts of a fraction distilling in the range of 117–123° C. and consisting of about 74% dimethylphenylcarbinol and about 26% acetophenone.

*Example 4*

One thousand parts of a mixture containing 27% peroxides and obtained by the air oxidation of crude diisopropylbenzene in the presence of 2% sodium hydroxide solution and activated carbon at a temperature of 60°–80° C. was placed in the apparatus described in Example 1. About four hundred parts of 8% sodium hydroxide solution was then added to the still and distillation carried out as in Example 3. About 60% of the oily reaction mixture subjected to the distillation was steam volatile and upon fractionation of this material there were obtained about 120 parts of unreacted diisopropylbenzene and 480 parts of a mixture consisting of about 85% dimethylcumylcarbinol and about 15% isopropylacetophenone. The nonvolatile residue from the steam distillation contained about 50% crystalline dihydric alcohols, bis-(α-hydroxyisopropyl) benzenes, and about an equal amount of a viscous liquid, mainly α-hydroxyisopropylacetophenone.

*Example 5*

One thousand parts of a mixture containing about 8% peroxides and obtained by the air oxidation of crude diisopropylbenzene in the presence of 2% sodium hydroxide solution at a temperature of 60°–80° C. was cooled to 3° C., resulting in the separation of about 10% crystalline dihydric alcohols. The remaining material was placed in the apparatus described in Example 1 and steam distilled over 20 parts of sodium carbonate. The steam volatile material amounted to slightly less than 45% of the crude product and contained small amounts of unchanged diisopropylbenzene, but the main constituents were dimethylcumylcarbinol and isopropylacetophenone. The steam distillation residue, amounting to slightly more than 45% of the crude product, was cooled and 15% of dihydric alcohols was obtained by crystallization. The remaining viscous liquid consisted of about 77% α-hydroxyisopropylacetophenone and about 23% diols.

*Example 6*

Six hundred fifty-two parts of a mixture containing 17% peroxides and obtained by the air oxidation of cumene at 40–55° C. in the presence of water containing 10 parts potassium permanganate was placed in the apparatus described in Example 1. To the still was added 500 parts of 4% sodium hydroxide solution and the mixture was then distilled at pot temperatures of 102–110° C. to obtain 491 parts of steam distillable material which was combined with the residue and fractionally distilled using an original pressure of 50 mm. of mercury during the removal of the unchanged cumene and a final pressure of 25 mm. of mercury during the removal of 337 parts of a mixture boiling at 98–106° C. and consisting of about 60% dimethylphenylcarbinol and about 40% acetophenone.

Although the process of this invention has been set forth in the examples as applied to the air oxidation products of p-cymene, cumene and diisopropylbenzene, the process is also applicable generally to the oxidation products of the compounds falling under the structural formula hereinbefore set forth. The aromatic nucleus shown by the structural formula need not be only that derived from benzene, for compounds containing aromatic nuclei derived from naphthalene, anthracene and phenanthrene also are operable. The aromatic nucleus may be substituted with alkyl groups such as methyl, ethyl, propyl, isopropyl, butyl, isobutyl, tertiary butyl and the like. The alkyl groups as represented by $R_1$ and $R_2$ may be such as those previously indicated as substituents in the aromatic nuclei and $R_1$ and $R_2$ may be either the same or different. The air oxidation of the compounds falling under the structural formula may be carried out upon the compounds themselves if they are liquids or upon solutions of the compounds if the latter are solids. Furthermore, the oxidation may be carried out in the presence of an aqueous medium such as liquid water or an aqueous alkali. Any oxygen-containing gas may be used, such as pure or commercial oxygen or air. Catalysts may be used to accelerate the oxidation and the reaction may be carried out at a temperature between about 25° C. and about 140° C. When using an aqueous medium during oxidation the temperature may be between about 25° C. and about 95° C., preferably between about 50° C. and about 90° C.

In carrying out the process of this invention, the oxidation reaction mixture such as that obtained from p-cymene by air oxidation may be treated either per se or after first removing acidic material. It is preferable first to remove the acidic material by alkaline extraction as with repeated washes with dilute alkali solutions. The alkali used may be a hydroxide, carbonate or bicarbonate of the alkali metals such as sodium, potassium, lithium and the like. It is preferable to use a mildly alkaline salt such as sodium bicarbonate and to carry out the extraction in a single treatment using a limited amount of water, and adding the alkaline salt in small portions with agitation until the aqueous layer shows a persistent alkaline reaction to litmus. By this procedure losses due to the partial solubility in water of some of the oxidation products are avoided. The extraction treatment utilizing sodium bicarbonate may be conveniently carried out at a temperature between about 60° C. and about 80° C. The aqueous layer is then drawn off and acidified with an acid such as sulfuric or hydrochloric acid, sulfur dioxide and the like to precipitate the cumic and other acids formed from p-cymene by the oxidation. If the salts of the acids rather than the acids themselves are desired, the aqueous alkaline solution may be treated to remove the water as by distillation.

The alkalies which may be used during the stabilization of the oxidized reaction mixture may be the hydroxides, carbonates and bicarbonates of the alkali metals. The examples all have shown the use of sodium hydroxide but the other alkali metal hydroxides are operable. When using the bicarbonates of the alkali metals the period of stabilization will be somewhat longer.

The concentration of the alkali may vary depending upon the nature of the alkali and the time allowed for the treatment. Higher concentrations permit shorter treatments. However, with too high concentrations, the pot temperature is so high that the peroxides will decompose and lead to undesired products. Moderate alkali concentrations are, therefore, preferred and may range from about 2% to about 18%, preferably from about 5% to about 12%.

The stabilization treatment may be carried out either under reflux or by slow distillation. The latter method is preferable since it provides a gradual increase in the concentration of the alkali and thereby effects a gradual increase in the pot temperature. This is advantageous because the rate of decomposition of the peroxides decreases as their concentration decreases; consequently, the gradual increase in temperature as caused by the gradual increase in concentration effects decomposition of low concentrations of peroxides. Another advantage in using distillation technique lies in the fact that the stabilization process then operates essentially as a steam distillation, and many of the oxidation reaction products are volatile with steam. A primary separation of the oxidation reaction products from the rest of the mixture is thus obtained and this may be advantageous during the subsequent fractional distillation step because various materials which might decompose at high pot temperatures have been removed by the initial steam distillation step.

Although the examples have shown that the stabilization treatment may be carried out at pot temperatures of 102°–110° C. the stabilization actually may be effected at a temperature between about 100° C. and about 130° C. A preferable temperature range lies between about 100° C. and about 110° C. and a particularly useful temperature is 105° C.

During the stabilization treatment, it is advisable to determine periodically the peroxide content of the oxidation reaction mixture. This may be determined by adding a sample of the material being stabilized to an acidified alkali iodide solution. In the case of p-cymene, for example, the results may be suitably calculated as per cent cymene hydroperoxide, based on a molecular weight of 166. The stabilization should be continued until the peroxide content reaches about 1% or lower. The time necessary to obtain this value will vary according to the original peroxide content and the nature and concentration of the alkali, but in general from about 2 to about 24 hours will be necessary. Shorter times are usually disadvantageous because undesirable side reactions take place, and longer times are impractical.

Following the stabilization treatment in which the distillation technique has been utilized, the oils from both the distillate and the still may be combined, dried and subjected to fractionation under reduced pressure in order to separate the oxidized material from the unoxidized. If reflux conditions were used during stabilization, the oils in the still may be so treated. In the case of the reaction products from p-cymene, namely 8-hydroxycymene and p-methylacetophenone, these have vapor pressure-boiling point curves so close together that separation of these components is not practical. However, the fractional distillation does accomplish the separation of unreacted p-cymene from the oxidation products. In the case of reaction products derived from compounds such as cumene and diisopropylbenzene the monohydric alcohols contained in the stabilized oils may be separated from the unreacted hydrocarbons and the ketones by fractional distillation. The oxidation products of cumene, for example, namely dimethylphenylcarbinol and acetophenone, can be separated in a packed column of about 40–60 theoretical plates.

The aqueous alkali solution utilized during the stabilization treatment may contain appreciable amounts of the alkali salts of organic acids such as cumic, these acids having been formed mainly by the oxidizing action of peroxides but in part also by a Cannizzaro reaction on any aldehydes formed during the original oxidation. These acids may be recovered from the alkaline solution by precipitation with a mineral acid.

In the oxidation of compounds having the structural formula hereinbefore set forth, it is believed that hydroperoxides are formed as intermediate reaction products. The various reaction conditions used during the oxidation affect the peroxide content. The use of alkaline aqueous media and low temperatures during oxidation favor a high peroxide content, whereas the presence of catalysts of heavy metals such as salts of manganese and lead, especially at elevated temperatures, tends to reduce the peroxide content. In the case of p-cymene, for example, the peroxide content may vary from about 1% to about 40%.

Cymene hydroperoxide decomposes even at relatively low temperatures but the reaction is very slow. In order to carry out the decomposition within a reasonable length of time it is necessary to raise the temperature to a point where undesired side reactions may occur. Such a reaction is illustrated by the dehydration of 8-hydroxycymene to p-methyl-α-methyl styrene. This dehydration is catalyzed by acids, even organic acids such as cumic. In the presence of an aqueous alkali, however, the dehydration does not occur. Furthermore, the stabilization according to this invention is desirable because there is present appreciable amounts of water in the stabilization reaction mixture. The water decreases overheating and thereby prevents a disorderly decomposition of the peroxides. A further advantage of the process of this invention is the fact that the temperature during stabilization is regulated by the boiling point of the hydrocarbonwater mixture over aqueous alkali. This temperature is determined to some extent by the concentration of the alkali and in any case is lower than temperatures previously suggested for the decomposition of peroxides such as those set forth by this invention.

The products obtained according to this invention find various commercial applications. For example, 8-hydroxycymene is used in the essential oil industry as a perfume base for soaps, and the compound also is an efficient frothing agent in the flotation of copper, zinc and lead sulfide ores. Dimethylphenylcarbinol has similar commercial applications. Cumic acid in the form of its alkali salts may be used in the separation of potassium and sodium salts by flotation, and esters of cumic acid exhibit a plasticizing effect in synthetic rubbers. The dihydric alcohols such as those derived from diisopropyl benzene also are efficient frothing agents in heavy metal, especially lead sulfide, ore flotations. All of the alcohols are good wetting-out agents. The steam volatile ketones obtained as by-products from most of these hydrocarbons have pleasant odors and may be used as perfume bases for soaps.

What we claim and desire to protect by Letters Patent is:

1. The process of stabilizing a reaction mixture produced by the oxidation of an alkyl-substituted aromatic organic compounds having the structural formula

in which $R_1$ and $R_2$ represent alkyl groups and Ar represents a substituent selected from the group consisting of aryl and alkaryl groups, said process comprising heating said reaction mixture at a temperature between about 100° C. and about 130° C. in the presence of aqueous alkali.

2. The process of stabilizing a reaction mixture produced by the oxidation of an alkyl-substituted aromatic organic compound having the structural formula

in which $R_1$ and $R_2$ represent alkyl groups and Ar represents a substituent selected from the group consisting of aryl and alkaryl groups, said process comprising heating said reaction mixture at a temperature between about 100° C. and about 110° C. in the presence of aqueous alkali.

3. The process of stabilizing a reaction mixture produced by the oxidation of p-cymene, said process comprising heating said reaction mixture at a temperature between about 100° C. and about 130° C. in the presence of aqueous alkali.

4. The process of stabilizing a reaction mixture produced by the oxidation of p-cymene, said process comprising heating said reaction mixture at a temperature between about 100° C. and about 130° C. in the presence of aqueous sodium hydroxide.

5. The process of stabilizing a reaction mixture produced by the oxidation of cumene, said process comprising heating said reaction mixture at a temperature between about 100° C. and about 130° C. in the presence of aqueous alkali.

6. The process of stabilizing a reaction mixture produced by the oxidation of cumene, said process comprising heating said reaction mixture at a temperature between about 100° C. and about 130° C. in the presence of aqueous potassium hydroxide.

7. The process of stabilizing a reaction mixture produced by the oxidation of diisopropylbenzene, said process comprising heating said reaction mixture at a temperature between about 100° C. and about 130° C. in the presence of aqueous alkali.

8. The process of stabilizing a reaction mixture produced by the oxidation of diisopropylbenzene, said process comprising heating said reaction mixture at a temperature between about 100° C. and about 130° C. in the presence of aqueous sodium carbonate.

9. The process of stabilizing a reaction mixture produced by the oxidation of an alkyl-substituted aromatic organic compound having the structural formula

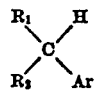

in which $R_1$ and $R_2$ represent alkyl groups and Ar represents a substituent selected from the group consisting of aryl and alkaryl groups, said process comprising heating said reaction mixture at a temperature between about 100° C. and about 130° C. in the presence of aqueous alkali, separating the resulting aqueous and oily phases, drying the oily phase and fractionally distilling the oily phase.

EUGENE J. LORAND.
JOHN E. REESE.

REFERENCES CITED

The following references are of record in the file of this patent:

UNITED STATES PATENTS

| Number | Name | Date |
|---|---|---|
| 1,098,764 | Richter | June 2, 1914 |

FOREIGN PATENTS

| Number | Country | Date |
|---|---|---|
| 646,087 | France | Dec. 22, 1927 |

OTHER REFERENCES

Stephens, "Jour. Am. Chem. Soc.," vol 48, pages 2920–2922 (1926).